(12) United States Patent
Haga et al.

(10) Patent No.: US 6,438,095 B1
(45) Date of Patent: Aug. 20, 2002

(54) DISC CLAMP MECHANISM FOR DISC APPARATUS

(75) Inventors: Yosuke Haga, Ohmiya; Tsutomu Imai, Ohme; Takeharu Sasada, Hchiouji; Shinji Masuda, Hino; Atuomi Ono, Hachiouji; Midori Murakami, Kokubunji, all of (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/508,469

(22) PCT Filed: Sep. 3, 1998

(86) PCT No.: PCT/JP98/03955
§ 371 (c)(1),
(2), (4) Date: Mar. 10, 2000

(87) PCT Pub. No.: WO99/16064
PCT Pub. Date: Apr. 1, 1999

(30) Foreign Application Priority Data

Sep. 19, 1997 (JP) ............................................. 9-273540

(51) Int. Cl.⁷ ............................................... G11B 33/02
(52) U.S. Cl. ...................... 369/270; 369/262; 369/263; 369/271
(58) Field of Search ................................ 369/270, 262, 369/263, 75.2, 271; 360/98.08, 99.02, 99.05, 99.12

(56) References Cited

U.S. PATENT DOCUMENTS

| | | | |
|---|---|---|---|
| 4,736,358 A | 4/1988 | Hoshi et al. ................ 369/270 |
| 4,797,873 A | 1/1989 | Nobutani .................... 369/270 |
| 5,590,115 A | * 12/1996 | Kubo ......................... 369/290 |
| 5,872,681 A | * 2/1999 | Boutaghou ............... 360/99.12 |
| 5,907,533 A | * 5/1999 | Choi .......................... 369/271 |
| 6,160,780 A | * 12/2000 | Furukawa et al. ......... 369/75.2 |
| 6,229,781 B1 | * 5/2001 | Fujisawa et al. ........... 369/77.1 |
| 6,256,278 B1 | * 7/2001 | Furukawa et al. ......... 369/77.1 |
| 6,275,465 B1 | * 8/2001 | Shirashima et al. ....... 369/270 |

FOREIGN PATENT DOCUMENTS

| | | |
|---|---|---|
| GB | 2 093 256 A | 8/1982 |
| JP | 62-125568 | 6/1987 |
| JP | 1-162154 | 11/1989 |
| JP | 8-221864 | 8/1996 |

* cited by examiner

Primary Examiner—Allen Cao
Assistant Examiner—Dzung C Nguyen
(74) Attorney, Agent, or Firm—Eric J. Robinson; Nixon Peabody LLP

(57) ABSTRACT

A disc clamp mechanism for a disc apparatus is provided. In the disc clamp mechanism, a disc is clamped or unclamped by moving a clamper holding chassis near to or remote from a turntable, the clamper holding chassis holding a clamper with a clamper holder, and a contact portion of the clamper holder with the clamper is deformed relative to the clamper holding chassis along a motion direction of the clamper holding chassis. A large space can be formed between the clamper and a turntable in a disc unclamp state to prevent the disc from becoming in contact with the clamper or turntable and being damaged while the disc is transported. A stroke of the clamper holding chassis necessary for reserving the space is made small to make a disc apparatus compact.

20 Claims, 9 Drawing Sheets

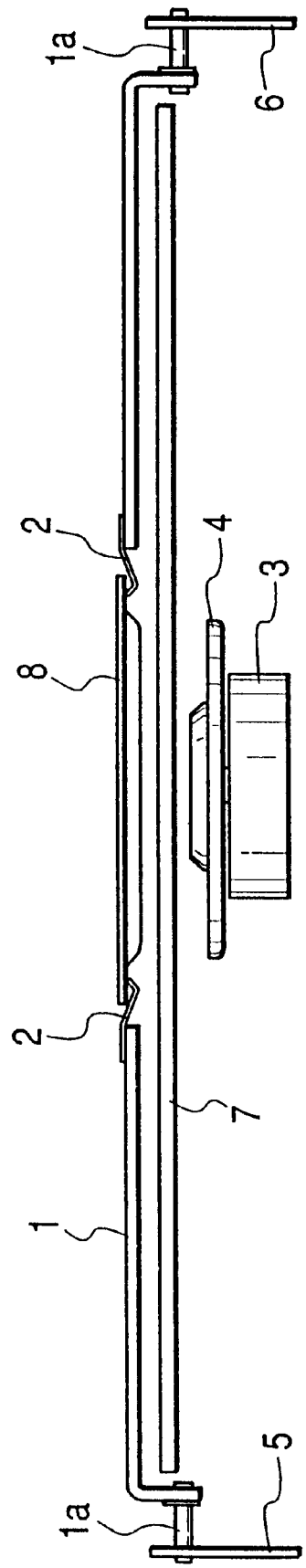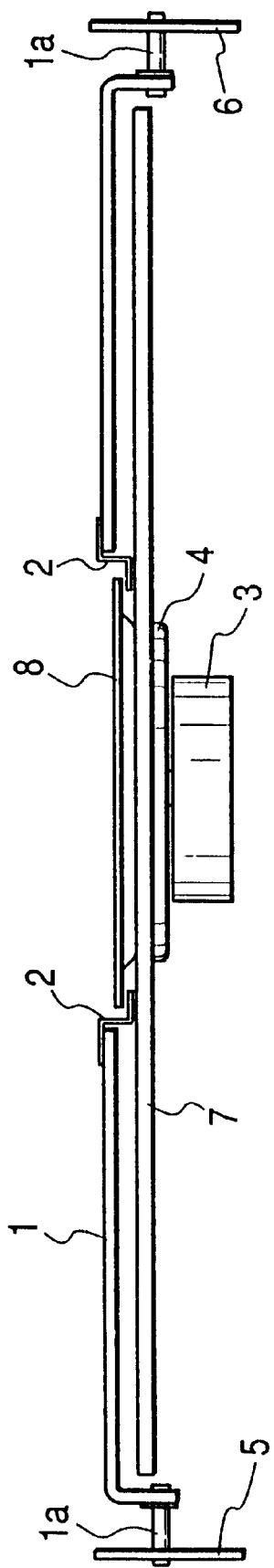

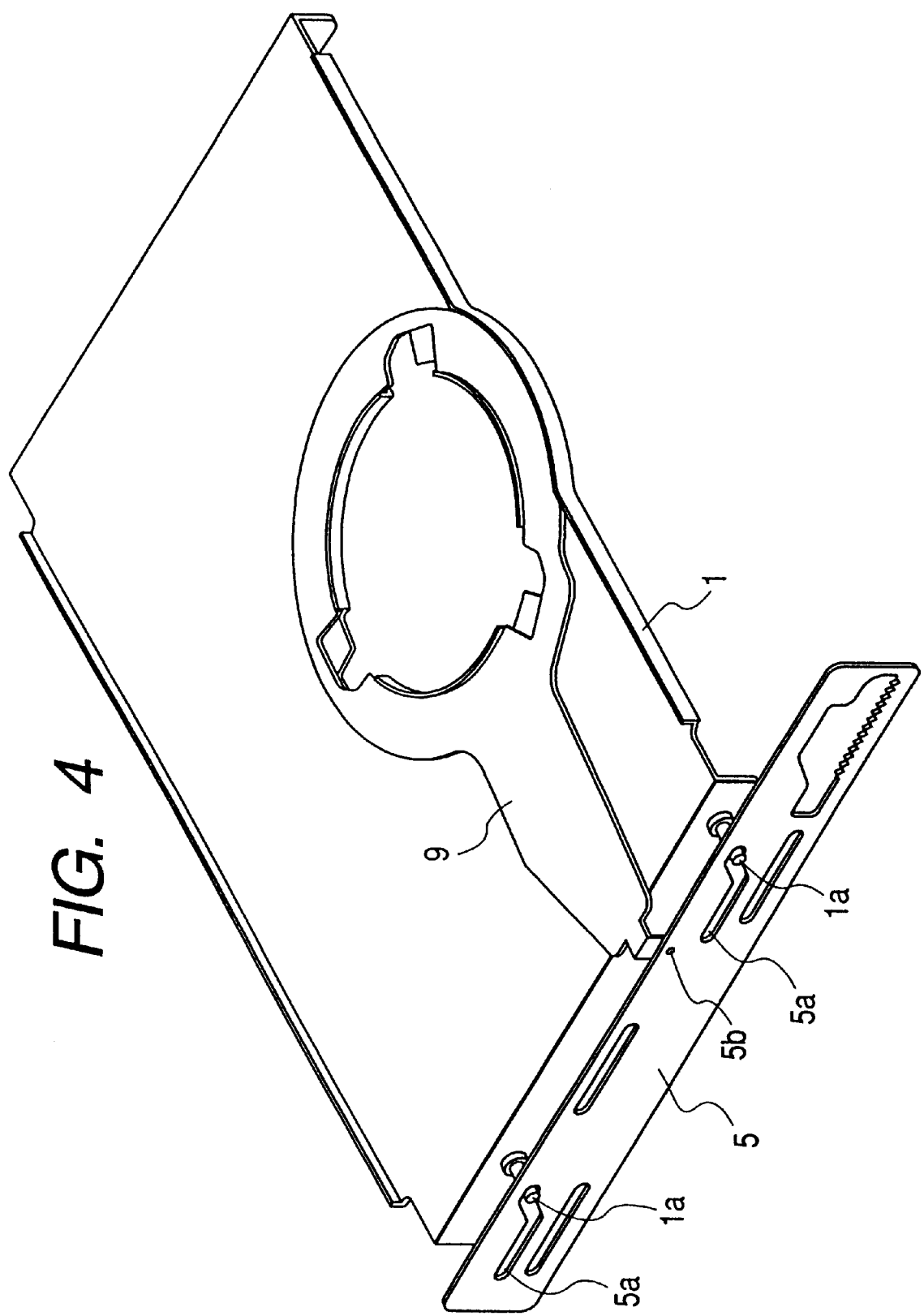

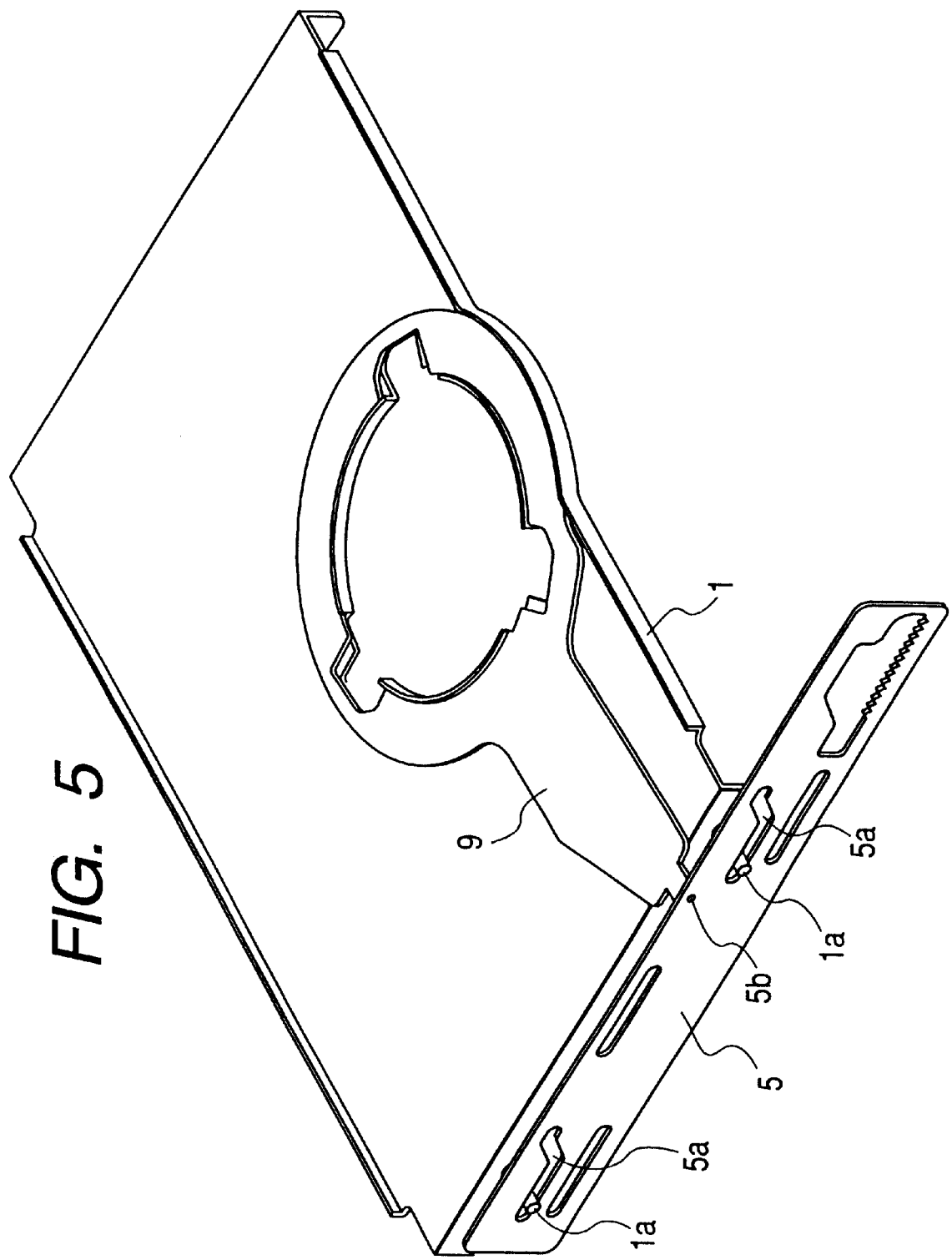

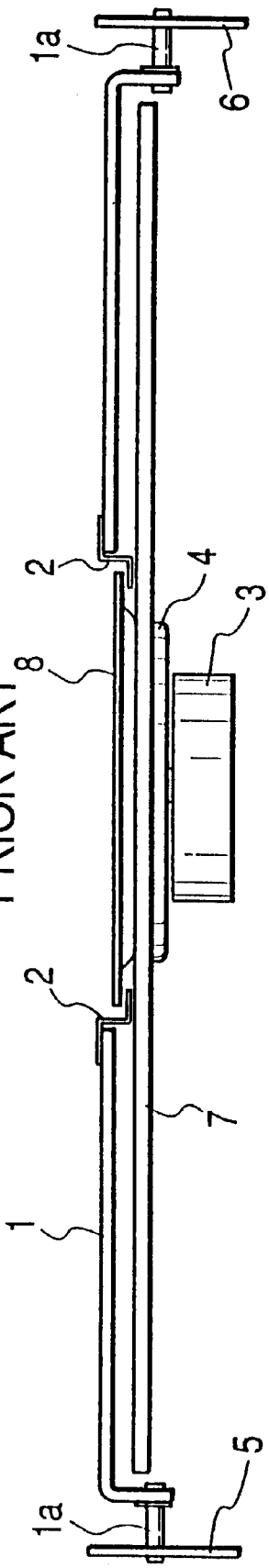
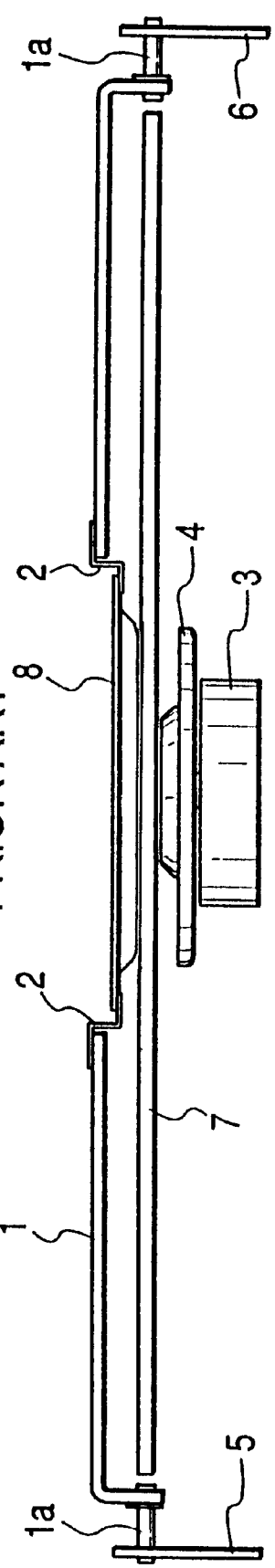
FIG. 8A PRIOR ART
FIG. 8B PRIOR ART

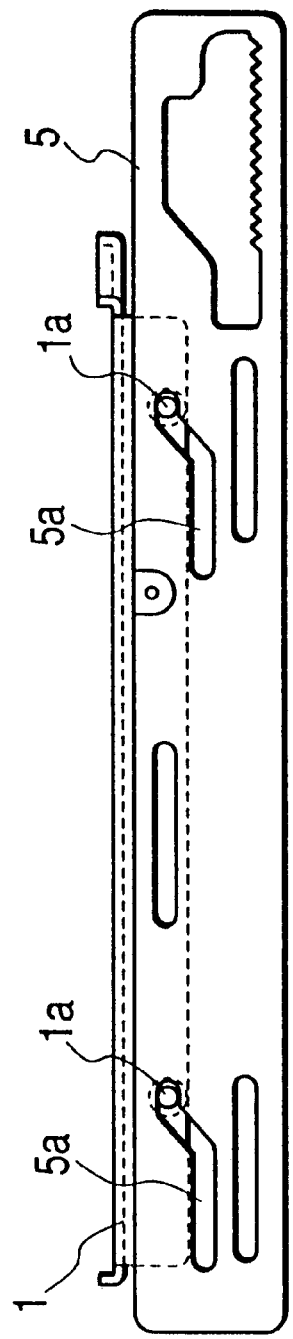
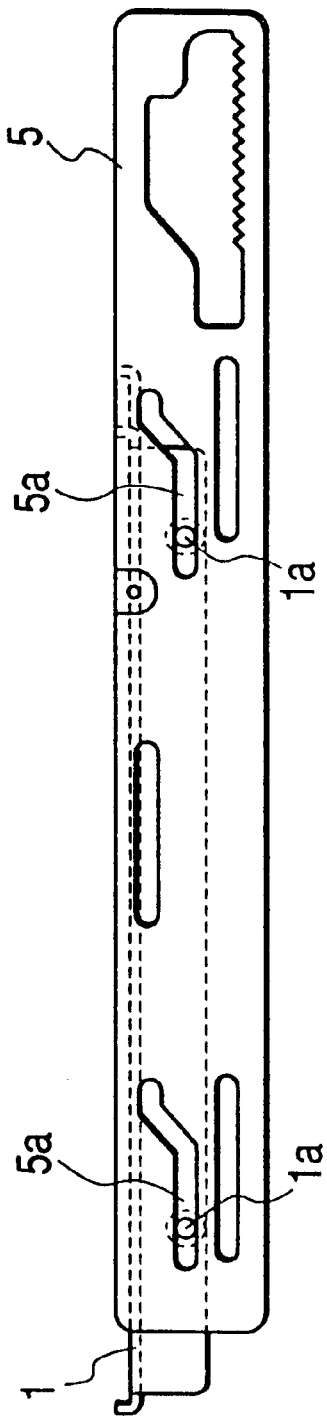
FIG. 10B PRIOR ART
FIG. 10A PRIOR ART

DISC CLAMP MECHANISM FOR DISC APPARATUS

BACKGROUND OF THE INVENTION

1. Field of the Invention

The present invention relates to a disc drive such as a CD player, and more particularly to a disc clamp mechanism capable of thinning a disc drive.

2. Description of the Related Art

An example of a conventional disc clamp mechanism for a CD player is shown in FIGS. 8A to 10B. As shown in FIGS. 8A and 8B, a disc motor 3 is fixedly mounted on a main chassis (not shown), and a turntable 4 is fixedly connected to a rotary shaft of the disc motor 3. A clamper holder 2 fixed to a clamper holding chassis 1 holds a clamper 8 over the turntable 4 when a disc 7 is unclamped, as shown in FIG. 8B.

A lift mechanism for the clamper holding chassis 1 is shown in FIG. 9 and FIGS. 10A and 10B. Shafts 1a, 1a, ... mounted upright on side walls of the clamper holding chassis 1 are inserted into cam grooves 5a, 5a, ... of sliders 5 and 6.

The sliders 5 and 6 are driven back and forth relative to the main chassis by an unrepresented drive mechanism. As the sliders 5 and 6 move, the clamper holding chassis 1 is raised or lowered. The shafts 1a, 1a, ... are also inserted into vertical grooves (not shown) of the main chassis.

In the disc unclamp state shown in FIG. 8B, the clamper holding chassis 1 is at a raised position. The disc 7 is transported by an unrepresented transport mechanism to a position over the turntable 4 via a space between the turntable 4 and clamper 8. Thereafter, as the clamper holding chassis 1 is lowered, the clamper holder 2 places the clamper 8 on the turntable 4 and becomes spaced from the clamper 8.

The clamper 8 is then attracted by a magnetic force of the turntable 4 to squeeze the disc 7 between the clamper 8 and turntable 4. This state is a clamp state of the disc 7 as shown in FIG. 8A. The clamped disc 7 is rotated by the disc motor 3, and an unrepresented optical pickup element is fed along a disc radial direction to reproduce data recorded in the disc 7.

Unclamping the disc 7 is conducted by raising the clamper holding chassis 1 from the position shown in FIG. 8A. The clamper holder 2 is made of a thin plate in order to prevent a contact with the disc 7 clamper 8 while the disc 7 is clamped.

In the conventional disc clamp mechanism described above, the clamper 8 greatly lowers toward the turntable 4 from the bottom surface of the clamper holding chassis 1 in the disc unclamp state. It is therefore difficult to provide a large space between the clamper 8 and turntable 4. From this reason, the disc 7 may contact the clamper 8 or turntable 4 while it is transported, and the disc 7 may be damaged.

If a lift stroke of the clamper holding chassis 1 is made large, a large space can be formed between the clamper 8 and turntable 4. However in this case, a height of the apparatus becomes large.

SUMMARY OF THE INVENTION

The invention has been made in view of the above problems. It is an object of the present invention to provide a disc clamp mechanism for a disc apparatus capable of providing a large space between a clamper and a turntable in a disc unclamp state even if the apparatus is made compact.

According to one aspect of the present invention, there is provided a disc clamp mechanism for a disc apparatus wherein a disc is clamped or unclamped by moving a clamper holding chassis near to or remote from a turntable, the clamper holding chassis holding a clamper with a clamper holder, and a contact portion of the clamper holder with the clamper is deformed relative to the clamper holding chassis along a motion direction of the clamper holding chassis.

In the disc clamp mechanism for a disc apparatus, the clamper holder may be made of a plate spring.

In the disc clamp mechanism for a disc apparatus, the bottom surface of the clamper may be made flush with or higher than a plane extending from the bottom surface of the clamper holding chassis in an unclamp state.

BRIEF DESCRIPTION OF THE DRAWINGS

FIGS. 1A and 1B are front views showing an outline of the structure of a disc clamp mechanism for a CD player according to a first embodiment of the invention.

FIG. 4 is a perspective view of the disc clamp mechanism.

FIG. 5 is a perspective view showing another state of the disc clamp mechanism.

FIGS. 8A and 8B are front views showing an outline of the structure of a conventional disc clamp mechanism for a CD player.

FIGS. 10A and 10B are side views illustrating the operation of the disc clamp mechanism shown in FIGS. 8A and 8B.

DETAILED DESCRIPTION OF THE PREFERRED EMBODIMENTS

Figure 2:
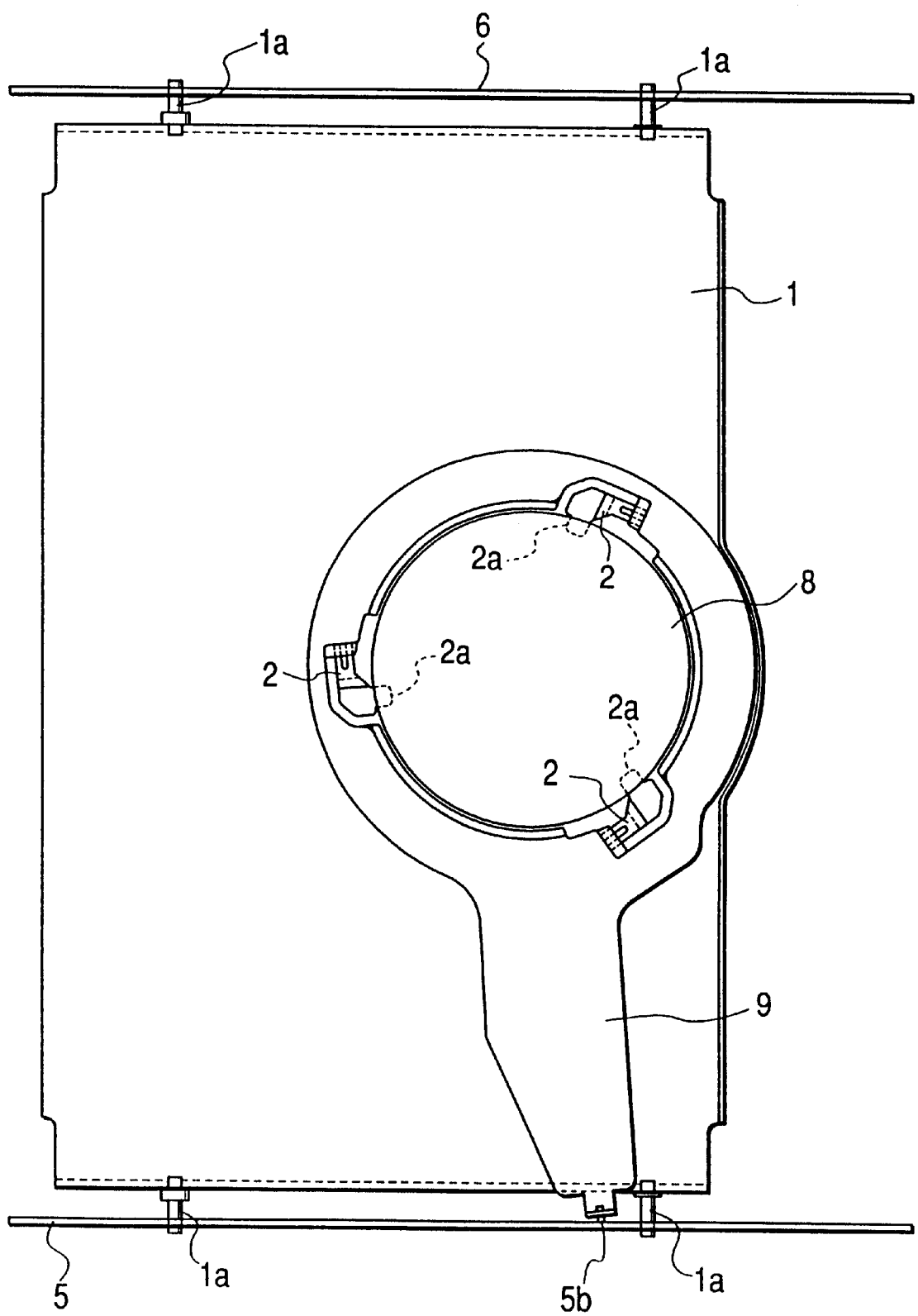
FIG. 2 is a plan view of the disc clamp mechanism.
Figure 3A:
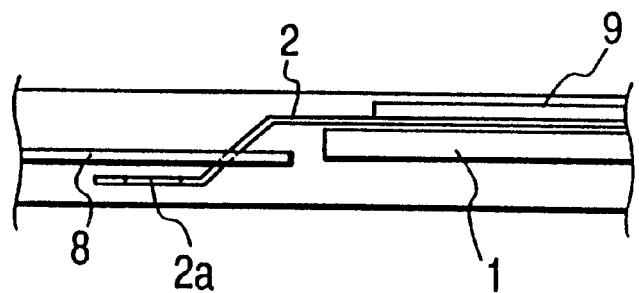
FIGS. 3A to 3D are partial side views illustrating the operation of the disc clamp mechanism.
Figure 3B:
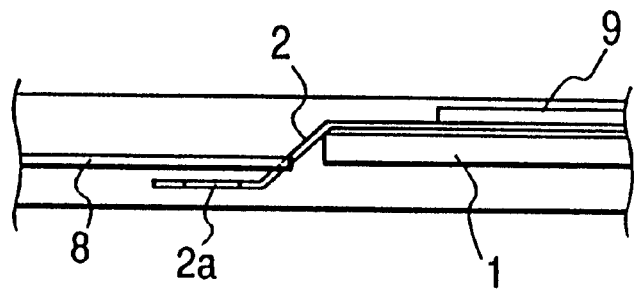
Figure 3C:
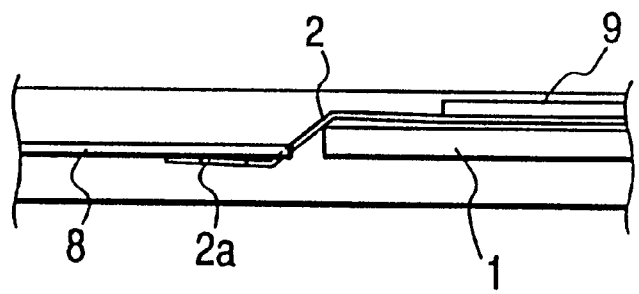
Figure 3D:
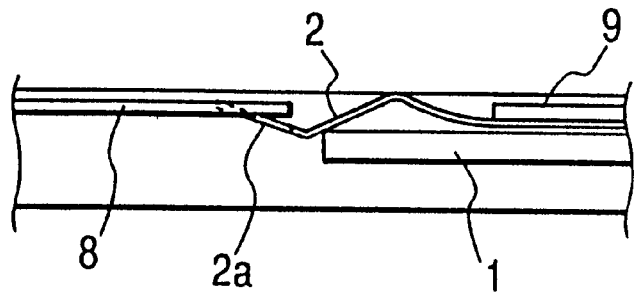
Figure 3E:
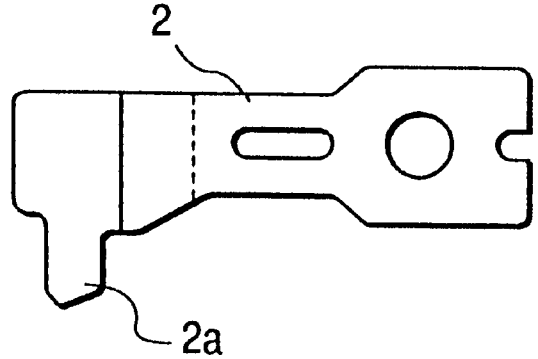
FIG. 3E is a plan view showing a clamper holder of the disc clamp mechanism.

A disc clamp mechanism for a CD player according to embodiments of the invention will be described with reference to the accompanying drawings. With reference to FIGS. 1A and 1B, the operation principle of a disc clamp mechanism for a CD player according to a first embodiment of the invention will be described. In FIGS. 1A and 1B, elements having similar functions to those of a conventional mechanism are represented by using identical reference numerals, and the detailed description thereof is omitted.

In the first embodiment, a clamper holder 2 is made of a plate spring. A contact portion of the clamper holder 2 with a clamper 8 is deformed upward in a disc unclamp state. In this state, the bottom surface of the clamper 8 held by the clamper holder 2 is raised higher than the bottom surface of a clamper holding chassis 1. FIG. 1B shows a clamp state of a disc 7.

With reference to FIGS. 2 to 5, the way the clamper holder 2 is deformed will be described. FIG. 3E shows the shape of the clamper holder 2. The clamper holder 2 has a projection 2a at its distal end portion. In a natural state not applied with a force, the clamper holder 2 is bent two steps so that the surface of the projection 2a is lower than its base end portion.

The base end portion of the clamper holder 2 is fixed to a lever 9 shown in FIG. 2. The lever 9 is rotatively fitted in the clamper holding chassis 1 and is rotated by a slider 5 as shown in FIGS. 4 and 5.

More specifically a shaft 5b mounted upright on the slider 5 is inserted in a vertical groove (not visible in FIGS. 4 and 5) formed in a bent portion of the lever 9. As shown in FIG. 4, as the slider 5 makes the clamper holding chassis 1 rise, the lever 9 is rotated in the clockwise direction as viewed from a higher position, whereas as shown in FIG. 5, as the slider 5 makes the clamper holding chassis 1 lower, the lever 9 is rotated in the counter-clockwise direction as viewed from a higher position.

While the lever 9 is rotated as the clamper holding chassis 1 is raised or lowered, a relative motion of the lever 9 and clamper holding chassis 1 deforms the projection 2a of the clamper holder 2 fixed to the lever 9.

FIGS. 3A to 3D shows a deformation of the projection 2a of the clamper holder 2. FIGS. 3A to 3D are drawn assuming that a weight of the clamper 8 is not applied to the clamper holder 2. The clamper holding chassis 1 is raised in the sequential order of FIGS. 3A to 3D. As shown, the projection 2a of the clamper holder 2 deforms along the motion direction of the clamper holding chassis Accordingly, as shown in FIG. 1B, the bottom surface of the clamper 8 becomes higher than the bottom surface of the clamper holding chassis 1 in the unclamp state of a disc 7. It is therefore possible to form a large space between the clamper 8 and a turntable 4 and prevent the disc 7 from contacting the clamper 8 or turntable 4 and being damaged while the disc 7 is transported. Furthermore, a stroke of the clamper holding chassis 1 necessary for reserving the space becomes small so that the disc apparatus can be made compact.

Figure 6A:
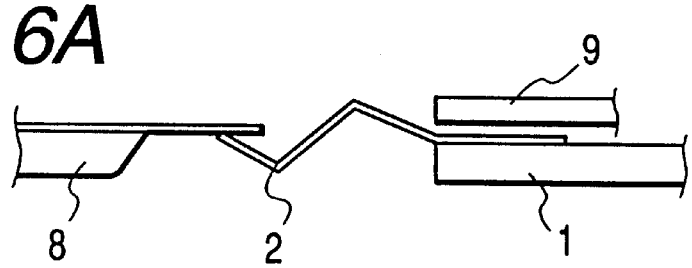
FIGS. 6A and 6B are partial side views illustrating the operation of a disc clamp mechanism for a CD player according to a second embodiment of the invention.
Figure 6B:
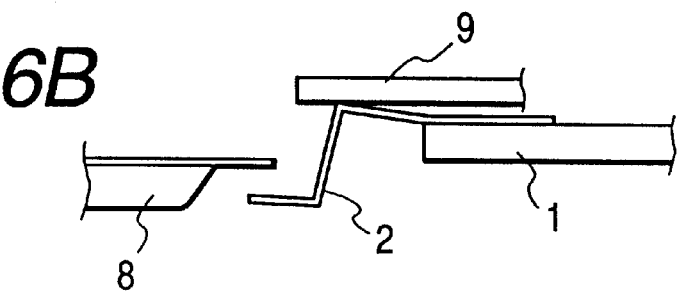

FIGS. 6A and 6B show a second embodiment of the invention. Similar to the first embodiment, the lever 9 is fitted in the clamper holding chassis 1 and rotated as the clamper holding chassis 1 is raised or lowered. The clamper holder 2 made of a plate spring is fixed to the clamper holding chassis 1. In a natural state not applied with a force, a contact portion of the clamper holder 2 with the clamper 8 is positioned higher than the base portion of the clamper 8.

FIG. 6A shows an unclamp state, and FIG. 6B shows a clamp state. Also with the configuration of the second embodiment, the bottom surface of the clamper 8 can be set higher than the bottom surface of the clamper holding chassis 1 in the unclamp state of a disc.

Figure 7:
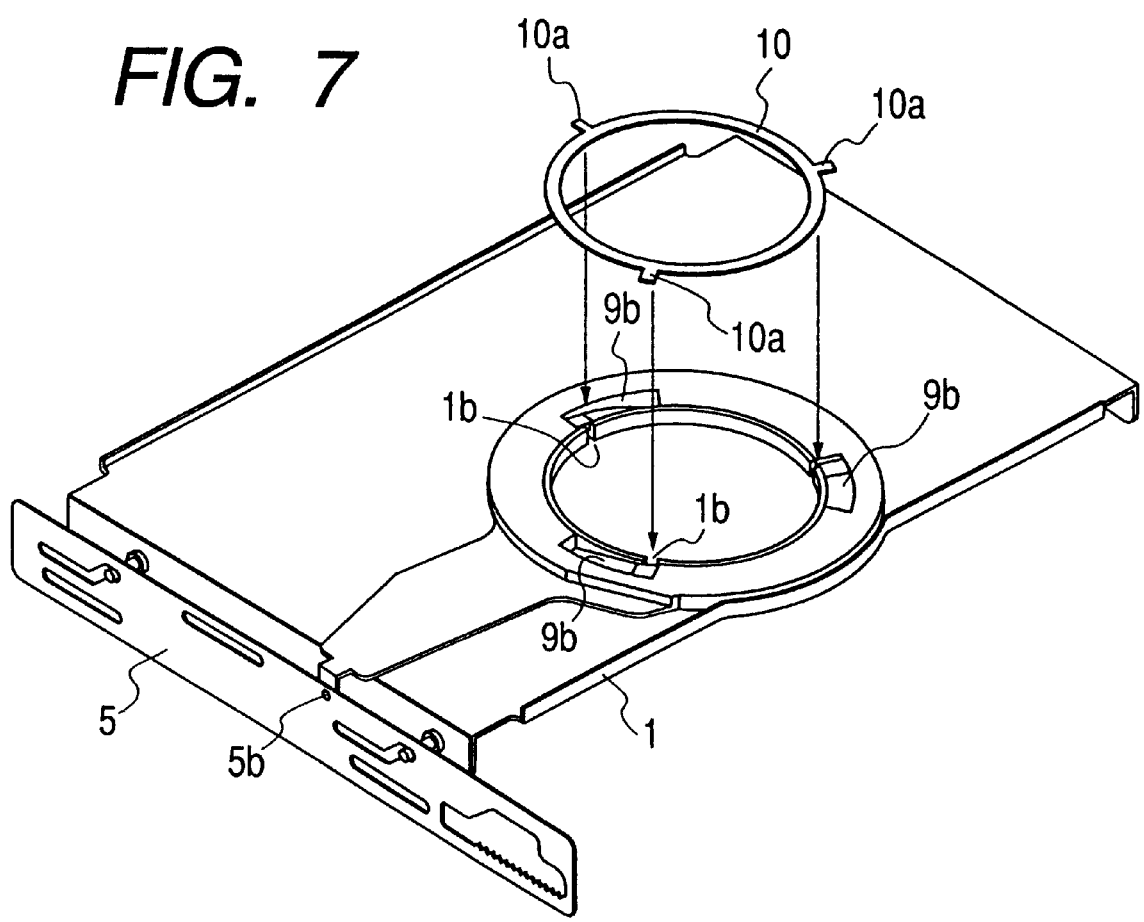
FIG. 7 is a perspective view of a disc clamp mechanism for a CD player according to a third embodiment of the invention.
Figure 9:
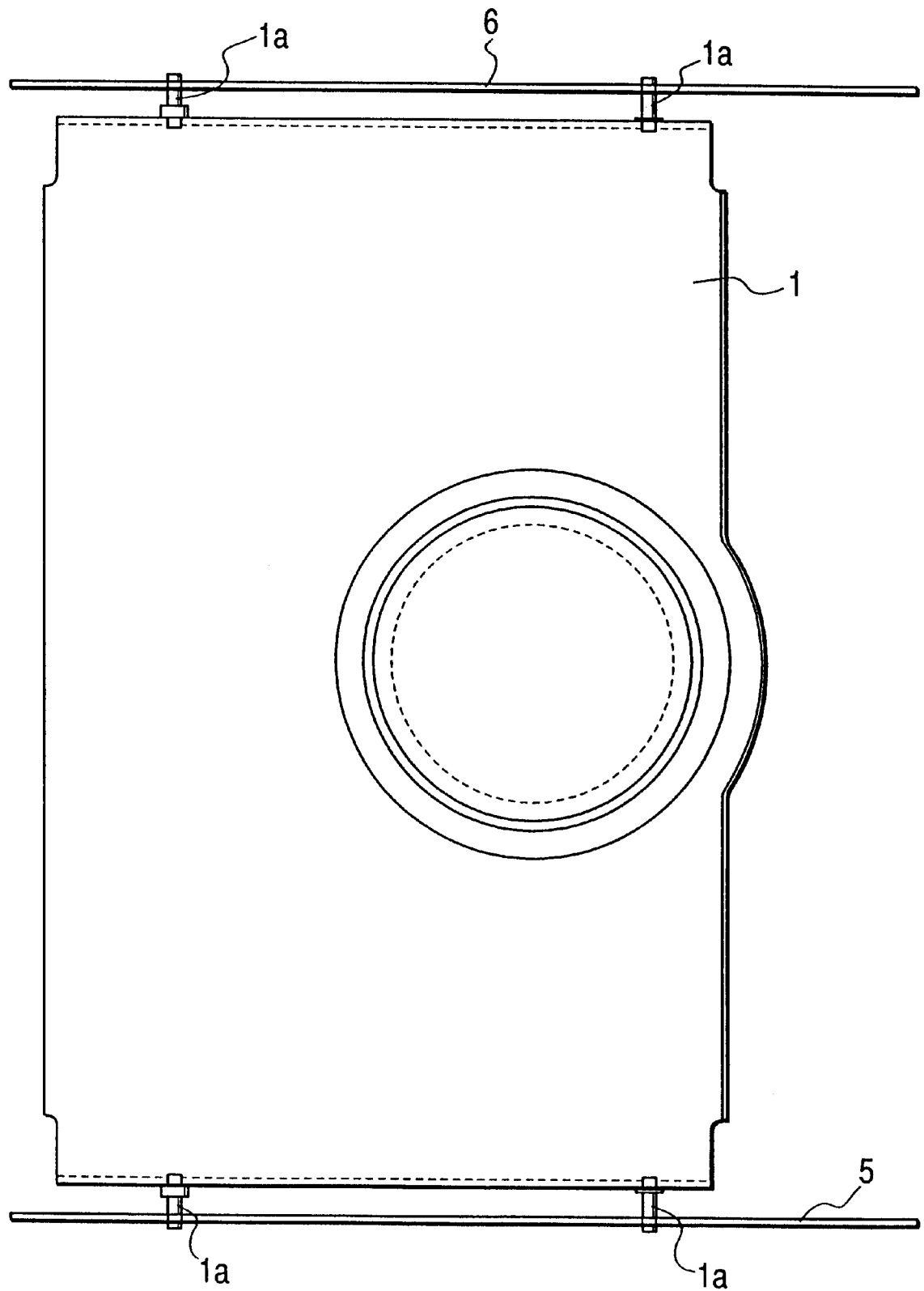
FIG. 9 is a plan view of the disc clamp mechanism shown in FIGS. 8A and 8B.

FIG. 7 shows a third embodiment of the invention. Similar to the first embodiment, the lever 9 is fitted in the clamper holding chassis 1 and rotated as the clamper holding chassis 1 is raised or lowered. The lever 9 is formed with three slanted surfaces 9b. A clamper holder 10 is of a ring shape with three projections 10a.

The projections 10a of the clamper holder 10 are inserted into grooves 1b formed in the clamper holding chassis 1 and ride on the slanted surfaces 9b of the lever 9. Also with the configuration of the third embodiment, the bottom surface of the clamper 8 can be set higher than the bottom surface of the clamper holding chassis 1 in the unclamp state of a disc.

The invention is not limited to the above embodiments. For example, instead of deforming the clamper holder by the slider for raising or lowering the clamper holding chassis, it may be deformed by a drive mechanism with another motor dedicated to this mechanism.

According to the disc clamp mechanism for a disc apparatus of this invention, the bottom surface of the clamper can be made high than the bottom surface of the clamper holding chassis in the disc unclamp state. It is therefore possible to form a large space between the clamper and turntable to prevent the disc from being in contact with the clamper or turntable and being damaged while the disc is transported.

Furthermore, since a stroke of the clamp holding chassis necessary for reserving the space can be made small, the disc apparatus can be made compact.

What is claimed is:

1. A disc clamp mechanism for a disc apparatus wherein a disc (7) is clamped or unclamped by moving a clamper holding chassis (1) near to or remote from a turntable (4), said clamper holding chassis (1) holding a clamper (8) with a clamper holder (2), and a contact portion of said clamper holder (2) with the clamper (8) is deformed upon unclamping so that while the contact portion of the clamper holder is in contact with a corresponding contact portion of the clamper, the contact portion of the clamper holder is displaced so as to raise the corresponding contact portion of the clamper higher than the clamper holding chassis.

2. A disc clamp mechanism for a disc apparatus according to claim 1, wherein said clamper holder (2) is made of a plate spring.

3. A disc clamp mechanism for a disc apparatus according to claim 1, wherein when the disc is unclamped, a bottom surface of the clamper (8) is made, flush with or higher than a plane extending from the surface of said clamper holding chassis (1).

4. A disc clamp mechanism for a disc apparatus according to claim 2, wherein when the disc is unclamped, a bottom surface of the clamper (8) is made flush with or higher than a plane extending from the surface of said clamper holding chassis (1).

5. A disc clamp mechanism for clamping a disc on a turntable of a disc apparatus with a clamper, comprising:

a movable member (1) vertically movable relative to a disc surface, said movable member having an opening having a diameter at least larger than a diameter of the clamper;

a rotatable member (9) rotatable relative to the movable member in position alignment with the opening of said movable member, said rotatable member having an opening having a diameter at least larger than the diameter of the clamper; and a holder (2) mounted on said rotatable member, said holder having a holding portion (2a) extending into the opening of said rotatable member for holding the clamper from a lower surface thereof, wherein when the disc is clamped, the holding portion detaches from a lower surface of a flange of the clamper, and when the disc is unclamped, said rotatable member rotates as said movable member moves, and said movable member raises the holding portion to make the clamper detach from the turntable.

6. A disc clamp mechanism according to claim 5, wherein said rotatable member is rotatively positioned by a flange formed on an opening end portion of said movable member.

7. A disc clamp mechanism according to claim 5, wherein said holder has a first member bent downward and a second member bent upward relative to the first member and having the holding portion, and as said rotatable member rotates, the first member rides on said movable member to raise the holding portion.

8. A disc clamp mechanism according to claim 5, wherein said holder is made of a plate spring.

9. A disc clamp mechanism according to claim 5, wherein a bottom surface of the clamper remote from the turntable is positioned higher than a lower surface of said movable member.

10. A disc clamp mechanism according to claim 5, further comprising a slider (5) guided by a shaft (1a) formed on said movable member, for horizontally moving, wherein said rotatable member is mounted on a shaft (5b) formed on said slider and rotates as said slider moves in a horizontal direction.

11. A disc clamp mechanism for clamping a disc on a turntable of a disc apparatus with a clamper, comprising:

a movable member (1) vertically movable relative to a disc surface, said movable member having an opening having a diameter at least larger than a diameter of the clamper;

a rotatable member (9) rotatable relative to the movable member in position alignment with the opening of said movable member, said rotatable member having an opening having a diameter at least larger than the diameter of the clamper; and a holder (2) mounted on said rotatable member, said holder having a holding portion (2a) extending into the opening of said rotatable member for holding the clamper from a lower surface of a flange of the clamper, wherein when the disc is unclamped, the holding portion raises the clamper to make the clamper be remote from the turntable, and when the disc is clamped, said rotatable member rotates as said movable member moves, and said movable member lowers the holding portion to make the clamper be in contact with the turntable.

12. A disc clamp mechanism according to claim 11, wherein said rotatable member is rotatively positioned by flange formed on an opening end portion of said movable member.

13. A disc clamp mechanism according to claim 11, wherein said holder has a first member bent upward, a second member bent downward relative to the first member, and a third member bent upward relative to the second member and having the holding portion, and as said rotatable member rotates, said rotatable member rides on the first member to lower the holding portion.

14. A disc clamp mechanism according to claim 11, wherein said holder is made of a plate spring.

15. A disc clamp mechanism according to claim 11, wherein a bottom surface of the clamper remote from the turntable is positioned lower than a lower surface of said movable member.

16. A disc clamp mechanism according to claim 11, further comprising a slider (5) guided by a shaft (1a) formed on said movable member, for moving horizontally, wherein said rotatable member is mounted on a shaft (5b) formed on said slider and rotate as said slider moves in a horizontal direction.

17. A disc clamp mechanism for clamping a disc on a turntable of a disc apparatus with a clamper, comprising:

a movable member (1) vertically movable relative to a disc surface, said movable member having an opening having a diameter at least larger than a diameter of the clamper;

a rotatable member (9) rotatable relative to the movable member in position alignment with the opening of said movable member, said rotatable member having an opening having a diameter at least larger than the diameter of the clamper; and a holder (10) capable of being raised and lowered relative to said rotatable member and said movable member, said holder extending into the opening of said rotatable member for holding the clamper from a lower surface of a flange of the clamper, wherein when the disc is clamped, said rotatable member rotates to the lower said holder to make a bottom surface of the clamper be near to the turntable, as said movable member moves lower in a vertical direction, and when the disc is unclamped, said rotatable member rotates to raise said holder to make the clamper be remote from the turntable, as said movable member moves upper in a vertical direction.

18. A disc clamp mechanism according to claim 17, wherein said holder is of a ring shape having an inner diameter shorter than a diameter of the clamper and has a projection (10a) formed on an outer periphery thereof and extending radially, said projection is movably inserted into a groove (1b) formed in said movable member and placed on a slanted portion (9b) formed on said rotatable member, and said projection rises or lowers on said slanted portion as said rotatable member rotates.

19. A disc clamp mechanism according to claim 17, wherein a bottom surface of the clamper remote from the turntable is positioned higher than a lower surface of said movable member.

20. A disc clamp mechanism according to claim 17, further comprising a slider (5) guided by a shaft (1a) formed on said movable member, for moving horizontally, wherein said rotatable member is mounted on a shaft (5b) formed on said slider and rotates as said slider moves in a horizontal direction.

* * * * *